United States Patent [19]
Kuznia et al.

[11] Patent Number: 6,092,425
[45] Date of Patent: Jul. 25, 2000

[54] DIFFERENTIAL PRESSURE SENSOR HAVING AN ALLOY OR METAL ISOLATOR

[75] Inventors: Philip David Kuznia, Carmel; Mark Edward Kernien, Kokomo; William Edward Brown, Jr., Noblesville, all of Ind.

[73] Assignee: Delco Electronics Corp., Kokomo, Ind.

[21] Appl. No.: 09/256,372

[22] Filed: Feb. 24, 1999

[51] Int. Cl.⁷ ........................................................ G01L 9/04

[52] U.S. Cl. ................................................ 73/726; 73/756

[58] Field of Search ................................ 73/756, 726, 727

[56] References Cited

U.S. PATENT DOCUMENTS

| | | | |
|---|---|---|---|
| 4,838,089 | 6/1989 | Okada et al. | 73/727 |
| 5,461,922 | 10/1995 | Koen | 73/756 |
| 5,465,626 | 11/1995 | Brown et al. | 73/715 |
| 5,747,694 | 5/1998 | Baba et al. | 73/723 |

*Primary Examiner*—Joseph L. Felber
*Attorney, Agent, or Firm*—Jimmy L. Funke

[57] ABSTRACT

A differential pressure sensor (10) having a housing 12 and a metal or alloy isolator (14) for stress isolation of a sensing cell (28) that is mounted to the isolator (14). The metal or alloy isolator (14) has an opening (16) therein for providing access to the sensing cell (28). The housing (12) is molded around the isolator (14) creating a seal therebetween and isolating the sensing cell (28).

14 Claims, 3 Drawing Sheets

DIFFERENTIAL PRESSURE SENSOR HAVING AN ALLOY OR METAL ISOLATOR

TECHNICAL FIELD

The present invention relates to differential pressure sensors and more particularly to an isolator for a differential pressure sensor.

BACKGROUND ART

Federal government regulations require close monitoring of automotive fuel system vapor pressure. Sensitive electronic components are used as part of an On-board Diagnostic System (OBD II) to detect hydrocarbon leaks in a fuel system. However, the fuel system environment is extremely harsh.

Several attempts have been made to adapt integrated electronic sensors, normally used in ambient and atmospheric applications, so that they can withstand the hostile environment of an automotive fuel system. For example, placing the fragile sensing cell of a pressure sensor in a thermoplastic housing.

U.S. Pat. No. 5,465,626 to Brown et al. provides a pressure sensor in which the pressure sensitive sensing cell is attached to a stress isolation platform using an adhesive that has a similar thermal coefficient of expansion and provides a hermetic seal between the isolation platform and the sensing cell. The stress isolation platform is attached to a plastic sensor housing with semi-rigid adhesive providing stress isolation and a hermetic seal between the plastic housing and the stress isolation platform. The hermetic seal between the housing and the stress isolation platform and the hermetic seal between the sensing cell and the stress isolation platform isolates the sensitive electronics of the sensor from the harsh environment it is exposed to. However, the adhesive used to hermetically seal the isolator is directly exposed to the harsh environment.

The stress isolation platform is made of glass. A special blend of glass is required in order to withstand the thermal requirements of the sensor. Special bulk processing of the glass is required, which limits the number of suppliers capable of processing the glass. In addition, close tolerances of the glass after firing are required which adds significantly to the cost of the glass. The strength of glass is not easily quantifiable, adding to the potential for cracked glass during the sensor assembly process and leading to high scrap rates.

In an attempt to avoid the problems associated with adhesive failure, U.S. Pat. No. 5,461,922 to Koen provides a pressure transducer that has a header housing made of a thermoplastic material. The housing has a resilient diaphragm made of a material that includes the same base material as the housing, but is flexible. The sensing cell is secured to a circuit board and the circuit board is secured to the header by and adhesive bond. The header and diaphragm provide a fully enclosed housing that is filled with a pressure transfer medium to couple the resilient diaphragm to the sensing cell, without exposing the sensing cell to any harsh chemicals. So while the housing of the pressure sensor protects the adhesive from exposure to harsh chemicals, the housing filled with transfer medium filled is extremely complicated and costly to manufacture. In addition, the reliability of the sensor is questionable due to the need for additional materials, such as the circuit board and the transfer medium, and the potential for the transfer medium to leak from the housing.

SUMMARY OF THE INVENTION

The present invention is a differential pressure sensor having a stress isolator made of a metal alloy. The isolator is molded inside of a one-piece thermoplastic housing. The shape of the isolator is such that optimal plastic flow is achieved around the isolator during the injection molding process, creating a seal between the isolator and the housing. Because the isolator is molded into the housing there is no need for epoxy to adhere the isolator to the housing. The isolator is a metal or alloy material. Thereby avoiding the inconsistencies associated with prior art glass isolators.

The differential pressure sensor of the present invention is a one-piece thermoplastic housing with a metal alloy, isolator molded into it. A sensing cell is bonded to the topside of the metal alloy, isolator. The isolator is a disc, preferably circular, having an opening therein to provide access to the sensing cell. The underside of the isolator is in contact with the medium being sensed and the metal alloy, material remains resistant to the harsh chemical environment, such as a fuel system.

In one embodiment of the isolator, the surface area of the isolator that comes in contact with the housing is rough to promote adhesion of the plastic when the housing is molded around the isolator. This feature and the circular shape of the isolator enhance the seal created between the isolator and the housing during the molding process.

In another embodiment of the isolator, the outer periphery of the disc has a downward edge that further enhances the sealing between the isolator and the housing.

It is an object of the present invention to improve the reliability of pressure sensors by eliminating the need for adhesive that is corroded by the harsh environment of a fuel tank system. It is another object of the present invention to improve the manufacturing process of pressure sensors by using a metal isolator thereby, reducing the cost and increasing the quality. It is still another object of the present invention to improve sensor performance by providing a reliable seal between the isolator and the housing.

It is a further object of the present invention to provide an insert that is easily manufactured saving assembly time and thereby cost of the insert.

Other objects and features of the present invention will become apparent when viewed in light of the detailed description of the preferred embodiment when taken in conjunction with the attached drawings and appended claims.

BEST MODES FOR CARRYING OUT THE INVENTION

Figure 1:
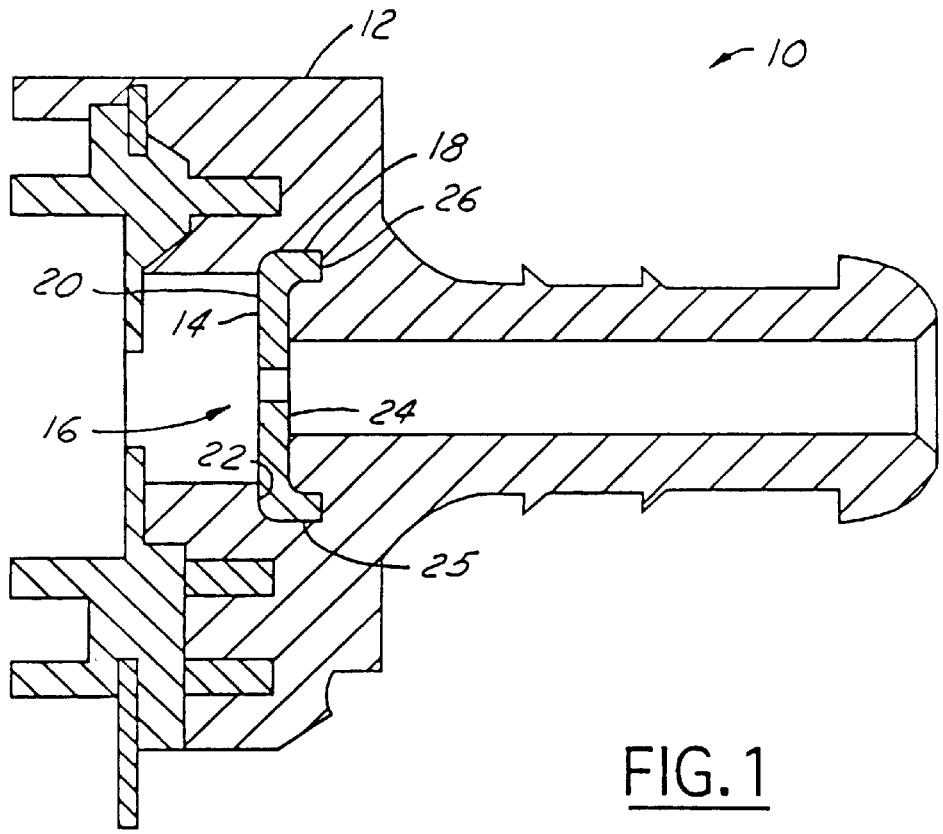
FIG. 1 is a cross-sectional partial view of a pressure sensor housing and isolator for the pressure sensor of the present invention.

Referring to FIGS. 1 through 4, and in particular to FIG. 1, there is shown a portion of a pressure sensor 10 of the present invention. It has a one-piece thermoplastic housing 12. The housing 12 is injection molded and includes an isolator 14 that is preferably a metal or other alloy.

Figure 2:
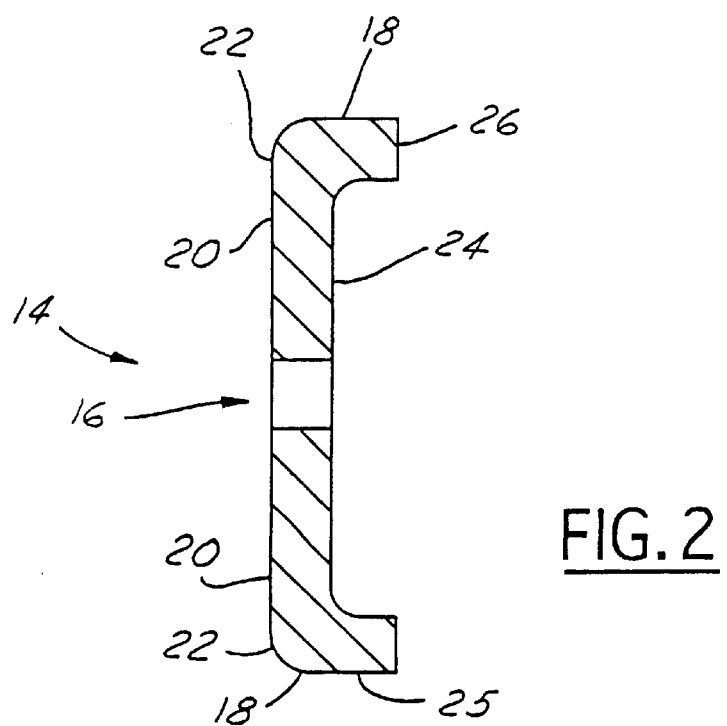
FIG. 2 is a cross-sectional view of one embodiment of the isolator for the pressure sensor of the present invention.
Figure 3:
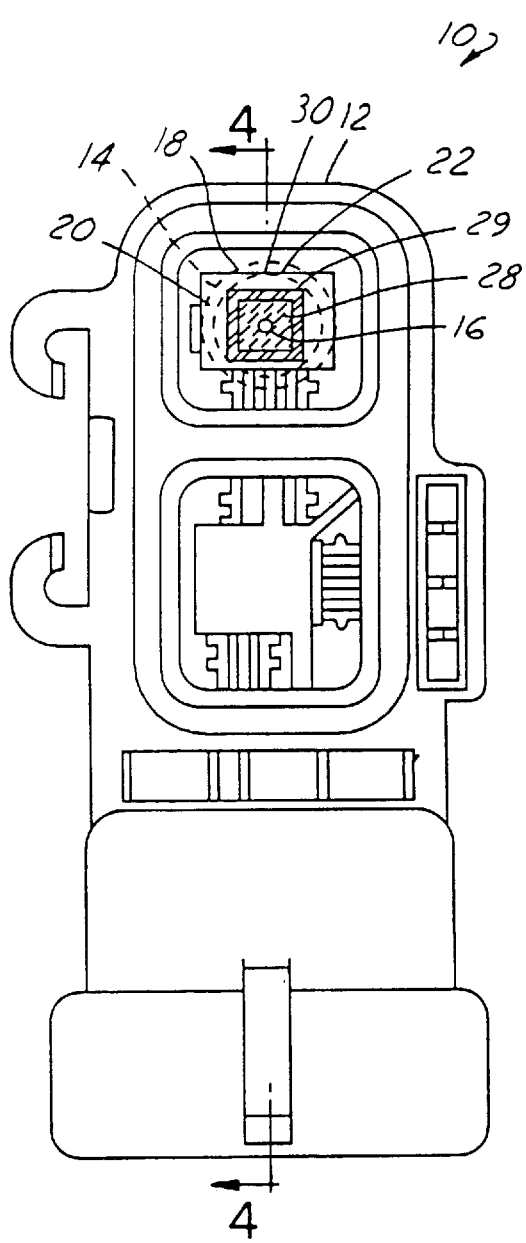
FIG. 3 is a top view of a pressure sensor housing showing the sensing cell, the isolator being shown in phantom.

A first embodiment of the isolator 14 is shown in FIGS. 1 and 2. The isolator 14 has a disc shape, preferably circular, having an opening 16 therein. A first, or outer, diameter 18 and a second diameter 20 that is smaller than the first diameter 18, as best shown in FIG. 3, define a surface area 22 that is less than the entire surface area of the isolator 14. In the embodiment of the isolator 14 shown in FIGS. 1 and 2, the surface area 22 between the first and second diameters 18 and 20 has a roughened or textured surface to promote adhesion of the isolator 14 to the thermoplastic of the housing 12 during manufacture. The rough surface area 22 also enhances the seal between the housing 12 and the isolator 14.

The housing 12 is preferably injection molded. The isolator 14 is inserted into the injection molding die prior to molding, so that the housing 12 surrounds the outer diameter of the isolator 14 creating a seal between the housing 12 and the isolator 14.

In the embodiment shown in FIGS. 1 and 2, the outer periphery 25 of the isolator 14 has a downward extension or lip 26. The downward lip 26 on the underside of the isolator 14 performs the function of providing an enhanced seal between the housing 12 and the isolator 14. The downward lip 26 prevents potential lateral movement of the isolator 14 within the housing 12.

A portion of the underside 24 of the isolator 14 is directly exposed to the medium being monitored. The opening 16 provides access to the sensing electronics (not shown in FIG. 2) and the medium to be sensed. For example, the medium can consist of vapors in a fuel tank system (not shown).

Figure 4:
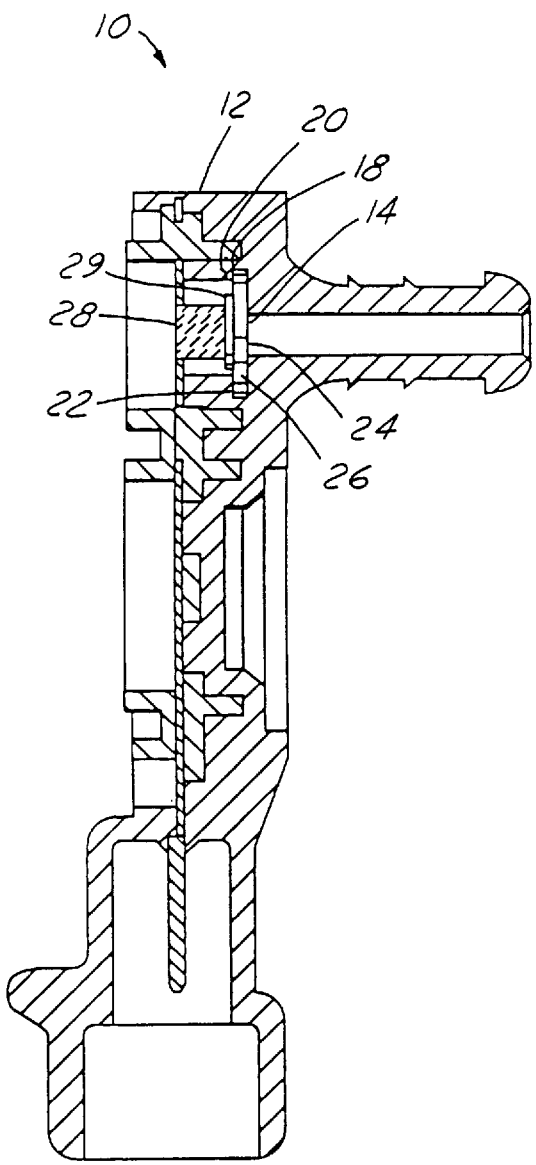
FIG. 4 is a cross-sectional view of the pressure sensor shown in FIG. 3, the cross section being taken along line 4—4 in FIG. 3 and in the direction of the arrows.

A top view of the entire pressure sensor 10 is shown in FIG. 3. FIG. 4 is a side view of the pressure sensor 10. In the sensor, a sensing cell 28 is bonded with a layer of epoxy 29 or other suitable adhesive, to the top surface 30 of the isolator 14. The opening 16 in the isolator 14 exposes the sensing cell 28 to the medium being monitored.

Figure 5:
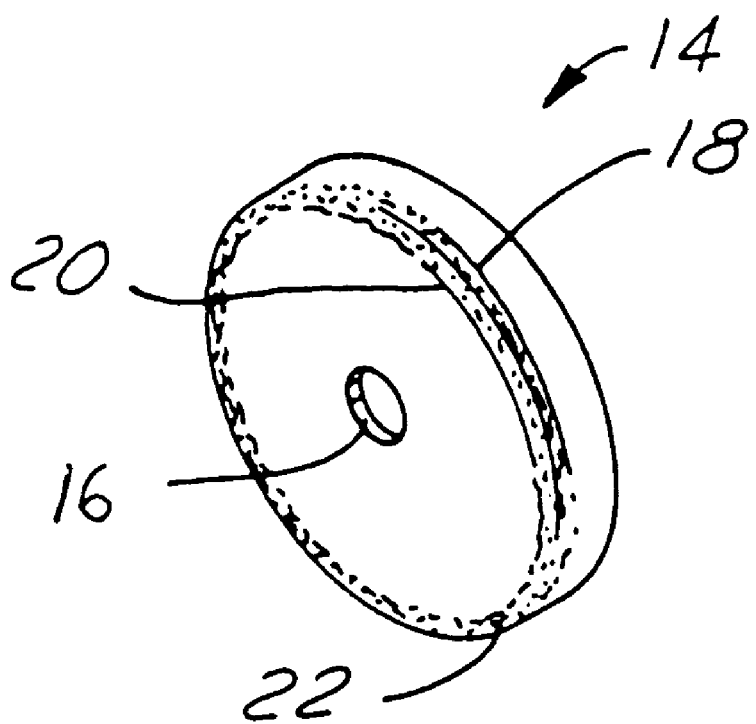
FIG. 5 is a perspective view of the isolator shown in FIGS. 3 and 4.

In the embodiment shown in FIGS. 3 and 4, the isolator 14 does not have a downward lip but is shaped like a flat disc. A perspective view of the isolator 14 is shown in FIG. 5. The housing 12 captures the outer diameter 18 of the isolator 14. The housing 12 extends over, contacts and creates a seal with the roughened surface area 22.

The material of the isolator 14 is a metal alloy that has a low coefficient of thermal expansion. The sensing cell 28 is attached to the isolator 14 by a layer of adhesive 29, such as an epoxy. It is desirable (but not necessary) for the coefficient of thermal expansion for the isolator 14 to match the coefficient of thermal expansion for the sensing cell 28 in order to avoid any undue stress on the sensing cell 28.

The isolator 14 is easily formed from raw sheet metal stock. The properties of metal alloys are easily quantified, thereby providing a more reliable manufacturing process. The strength of metal and alloy is significantly higher than that of the glass used in the prior art, adding to the reliability of the manufacturing process and the pressure sensor 10. The ductile properties of metal alloy allow the isolator 14 to withstand shrinkage of the thermoplastic housing 12 as it cools after molding. Prior art glass isolators have a tendency to crack from mold shrinkage. Also, metal and alloy structures remain stable over the thermal operating range, typically −25° C. to 125° C. Prior art glass inserts are adversely affected by the thermal cycle and actually becomes unstable after being exposed to the heat necessary during the injection molding process.

While particular embodiments of the invention have been shown and described, numerous variations and alternate embodiments will occur to those skilled in the art. Accordingly, it is intended that the invention be limited only in terms of the appended claims.

What is claimed is:

1. A pressure sensor comprising:

a housing;

an alloy disc mounted within said housing, said disc having an opening therein and a roughened surface area on at least one portion of said disc; and a sensor cell mounted to said disc for receiving a pressure through said opening in said disc.

2. The pressure sensor as claimed in claim 1 wherein said disc is circular, said disc has a first diameter and a second diameter that is smaller than the first diameter to define a surface area, said surface area contacting said housing and creating a seal between said disc and said housing.

3. The pressure sensor as claimed in claim 2 wherein said surface area is textured.

4. The pressure sensor as claimed in claim 1 wherein said sensor cell is mounted to said disc using an epoxy.

5. The pressure sensor as claimed in claim 1 wherein said disc has a lip member thereof for preventing movement of said disc within said housing.

6. The pressure sensor as claimed in claim 1 wherein said housing is thermoplastic.

7. The pressure sensor as claimed in claim 6 wherein said thermoplastic housing is molded around said disc.

8. A pressure sensor comprising:

a housing;

metal disc mounted within said housing, said disc having an opening therein, said disc having a roughened surface; and a sensor cell mounted to said disc for receiving a pressure through said opening in said disc.

9. The pressure sensor as claimed in claim 8 wherein said disc is circular, said disc has a first diameter and a second diameter that is smaller than the first diameter to define a surface area, said surface area contacting said housing and creating a seal between said disc and said housing.

10. The pressure sensor as claimed in claim 9 wherein said surface area is textured.

11. The pressure sensor as claimed in claim 8 wherein said sensor cell is mounted to said disc using an epoxy.

12. The pressure sensor as claimed in claim 8 wherein said disc has a downward lip for preventing movement of said disc within said housing.

13. The pressure sensor as claimed in claim 8 wherein said housing is thermoplastic.

14. The pressure sensor as claimed in claim 13 wherein said thermoplastic housing is molded around said disc.

* * * * *